United States Patent [19]

Orshansky, Jr.

[11] 3,783,711
[45] Jan. 8, 1974

[54] PLURAL RANGE TRANSMISSION
[75] Inventor: Elias Orshansky, Jr., San Francisco, Calif.
[73] Assignee: Orshansky Transmission Corporation, New York, N.Y.
[22] Filed: June 2, 1972
[21] Appl. No.: 259,025

[52] U.S. Cl. .................................................. 74/687
[51] Int. Cl. ............................................ F16h 47/04
[58] Field of Search ..................................... 74/687

[56] References Cited
UNITED STATES PATENTS

| | | | |
|---|---|---|---|
| 2,817,250 | 12/1957 | Forster | 74/687 |
| 3,212,358 | 10/1965 | DeLalio | 74/687 |
| 3,534,632 | 10/1970 | Smith | 74/687 |
| 3,592,077 | 7/1971 | Polak | 74/687 |
| 3,626,692 | 12/1971 | Kumm | 74/687 X |
| 3,667,321 | 6/1972 | Maurice | 74/687 X |

Primary Examiner—Allan D. Herrmann
Assistant Examiner—Parshotam S. Lall
Attorney—Owen, Wickersham & Erickson

[57] ABSTRACT

A transmission comprising a plurality of planetary assembiles, each having input means, output means, and reaction means, the output means for the one assembly being in driving relation with the input means of a succeeding assembly. Respective clutches connect (1) the input means of the first assembly to the input shaft, (2) the input means of the first assembly to the output means thereof, (3) the output means of the first assembly to the output shaft, (4) the output means of the second assembly to said output shaft. First and second hydraulic units are connected together so that when one is a pump the other is a motor and vice versa, the first hydraulic unit having a fixed stroke and the second hydraulic unit having a variable stroke and driven by the input shaft, the second hydraulic unit being connected by a gear train to the reaction means of both planetary assemblies, which rotate in opposite directions.

22 Claims, 9 Drawing Figures

PLURAL RANGE TRANSMISSION

BACKGROUND OF THE INVENTION

This invention relates to an improved transmission of a type employing a pair of planetary assemblies and also employing a variable-stroke hydraulic unit and a fixed-stroke hydraulic unit.

Transmissions of this general type have heretofore been subject to losses in transmitting power from the engine to the input of the planetary assembly, due to gear trains or other intervening members.

Gear loads have heretofore been relatively high, and the planets have been subject to excessive speeds; also there has been excessive relative rotation between the members of the planetary assembly, resulting in lowering efficiencies.

In designs where input gearing into a planetary assembly transmits both the engine torque and the hydraulic regenerative torque, the gear and bearing loads have become undesirably high.

In addition, the proportions of the planetary assemblies were such that the planet gears were too small, and it was difficult to provide planet bearings of sufficient capacity.

SUMMARY OF THE INVENTION

A feature of this invention is that the transmission employs a pair of planetary assemblies in which both output members can be planet carriers, in which the input shaft is directly clutchable to the input of one planetary assembly, and in which the input shaft is also at all times connected to a variable-stroke hydraulic unit. Furthermore, a fixed-stroke hydraulic unit is at all times connected to the reaction members of both planetary assemblies, the reaction members being so interconnected that they rotate in opposite directions. The two hydraulic units are connected together hydraulically, so that when one operates as a pump the other operates as a motor, and vice versa.

Since speed-varying planetary assembly is directly driven by the input shaft, there is no loss in transmitting power from the engine to the input of that planetary assembly. During the interval when the hydraulic horsepower is recirculated to the input, as explained below the gearing connecting the variable-stroke hydraulic unit to the input shaft is subject only to the added hydraulic torque, rather than to both the engine torque and the hydraulic recirculative torque.

The planetary gear loads are kept at a minimum because both carriers can be the output members for the two planetary assemblies. As a result the output torque of the planetary is the sum of the input torque and the reaction torque, which is the most favorable condition for this type of transmission. Moreover, there are no excessive speeds in the planets, regardless of the range ratio.

Another feature of the invention is that the relative speeds of the clutch members while they are disengaged are at a minimum. This condition is particularly important in the clutch which is used in the hydrostatic start and in the reverse, and contrasts strongly with prior art transmissions in which the clutch performing a function runs at very high relative speed while not engaged.

The planetary assembly which drives in the high speed range reaches an equal-speed point at its maximum output speed, so that there is no relative rotation between the members of this planetary assembly at that point, and this, of course, results in very high efficiency. Moreover, the other planetary assembly is not loaded at this time. One of the clutches can then be engaged in the hydromechanical range of maximum speed to provide a mechanical lock-up in direct drive, if that is desired. It is also possible to have two other lockup points, one at the bottom of the hydromechanical range, and the other midway in the hydromechanical range.

Other objects and advantages of the invention will appear from the following description of some preferred embodiments.

DESCRIPTION OF SOME PREFERRED EMBODIMENTS

A two-range system with internal tooth gears at certain points

Figure 1:
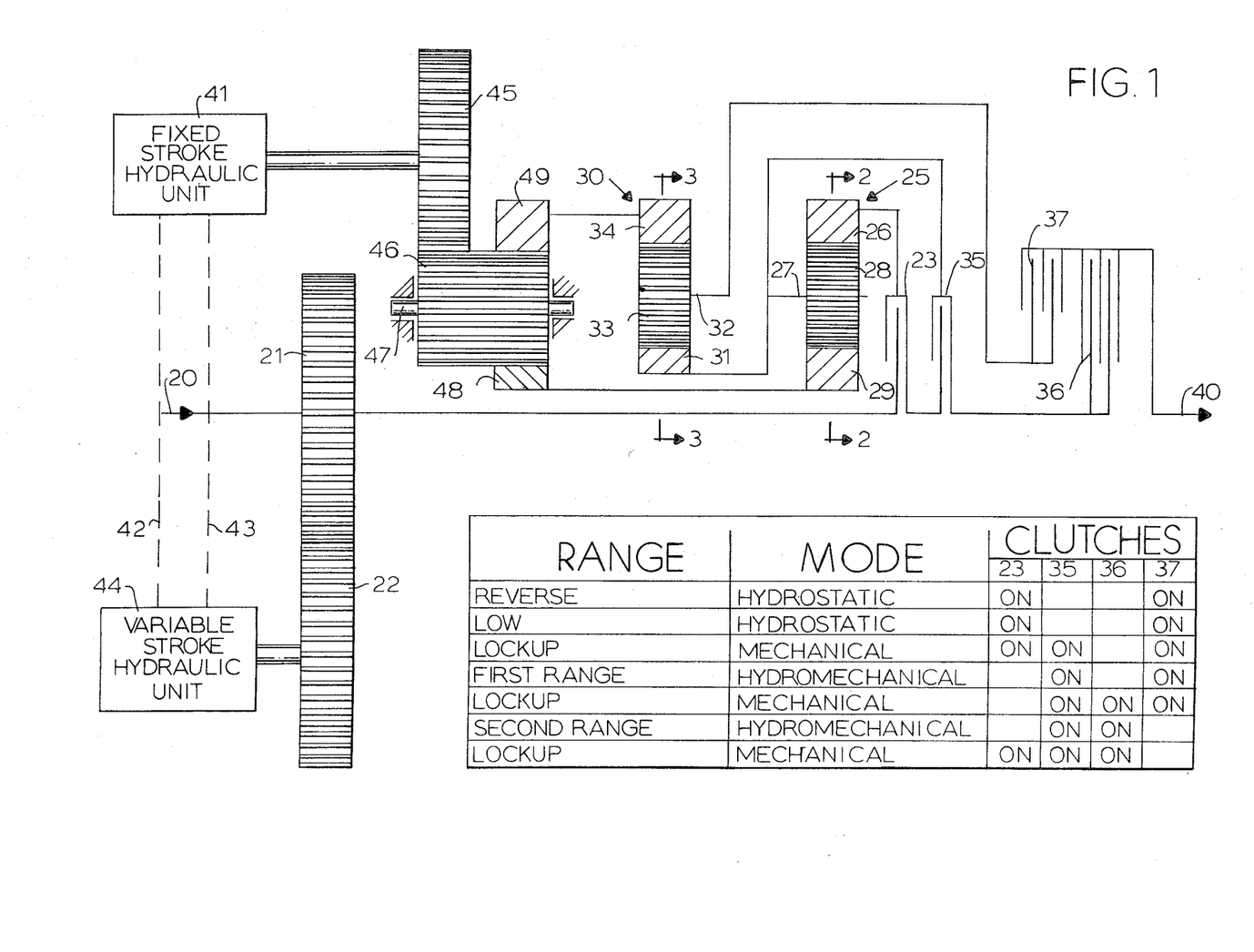
FIG. 1 is a schematic view of a two-range tramsmission embodying the present invention, using conventional symbols for planetary gearing, and showing for clarity and simplicity, only the half of the gearing above the shaft centerline, except for certain gears. The clutch system is tabulated hereon.
Figure 2:
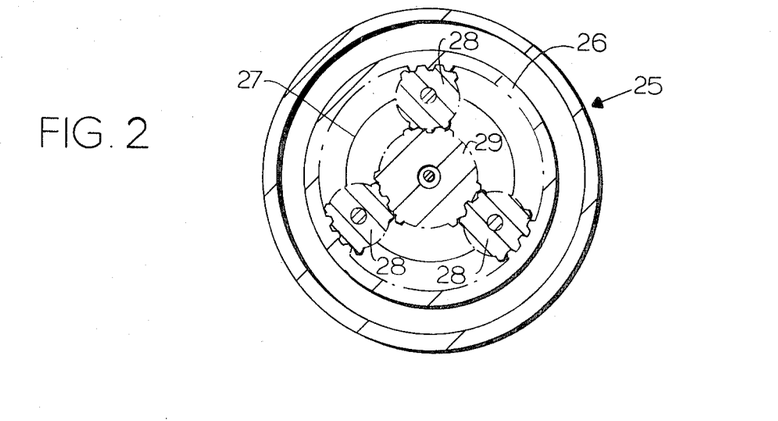
FIG. 2 is a view in section taken along the line 2—2 in FIG. 1, but showing the complete gear.
Figure 3:
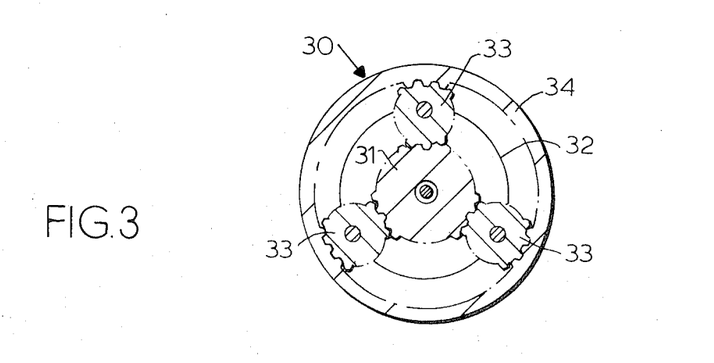
FIG. 3 is a similar view taken along the line 3—3 in FIG. 1.

In FIG. 1 an input shaft 20 is shown diagrammatically, and on it is shown a gear 21 which is in mesh with a gear 22. The input shaft 20 is coupled by a clutch 23 to a first planetary assembly 25 having a ring gear 26 serving as its input member and connected to the clutch 23. In addition to the ring gear 26 serving as the input member, the planetary assembly 25 has a planet carrier 27 serving as the output member and carrying a set of planet gears 28. There is also a sun gear 29 acting as the reaction member.

A second planetary assembly 30 is provided having as its input member a sun gear 31, which is at all times connected to the planet carrier 27. A planet carrier 32 serves as the output member of the assembly 30 and carries planet gears 33. A ring gear 34 serves as the reaction member for this second planetary assembly 30. A second clutch 35 makes it possible to clutch together the ring gear 26 and the planet carrier 27. A third clutch 36 makes it possible to clutch the planet carrier 27 to an output shaft 40, while a fourth clutch 37 makes it possible to clutch the output shaft 40 to the output planet carrier 32 of the second planetary assembly 30.

The device of FIG. 1 also includes two hydraulic units, a first hydraulic unit 41 having a fixed stroke and being connected by hydraulic lines 42 and 43 to a second hydraulic unit 44 having a variable stroke. The variable-stroke hydraulic unit 44 is connected in driving relation to the gear 22 and is therefore driven at all times by the input shaft 20. The fixed-stroke unit 41 drives a gear, or is driven by a gear, 45, which is in mesh with an idler gear 46 supported on a stationary shaft 47. The gear 46 is also in mesh with a gear 48, connected in driving relation at all times with the reaction gear 29 of the first planetary carrier 25. Similarly, an outer gear 49 is in mesh with the idler gear 46 and is at all times in driving relationship with the reaction or ring gear 34 of the second planetary train. Thus, the two reaction gears 29 and 34 are connected so that they rotate in opposite directions.

A table on FIG. 1 shows the relationship of the four clutches 23, 35, 36, and 37 to the ranges and modes of operation of the device.

The operation of the transmission of FIG. 1 will be described, starting from a complete standstill and progressing to the maximum output speed.

When starting, the transmission of FIG. 1 is in the hydrostatic mode, and the clutches 36 and 23 are disengaged, while the clutches 35 and 37 are engaged. Since the clutch 23 is disengaged in the hydrostatic mode, there is no connection between the input shaft 20 and either of the planetary assemblies 25 and 30, and the input shaft 20 drives only the variable-displacement hydraulic unit 44, which, in turn, drives the fixed-stroke hydraulic unit 41. The unit 44 acts as a pump, and the unit 41 acts as a motor. Since the clutch 35 is engaged, the first planetary assembly 25 can have no relative motion of its parts, because its input or ring gear 26 is then locked to its output or planetary carrier 27, so that the fixed-stroke hydraulic unit 41 drives directly through the gears 45, 46, and 48 to the sun gear 29 of the locked planetary assembly 25, and thence by means of the carrier 27 to the sun gear 31 of the second planetary assembly 30. Since the clutch 37 is also engaged, the planet carrier 32 drives the output shaft 40 through the clutch 37.

Under these conditions the second planetary assembly 30 operates with its sun gear 31 driven by the locked first planetary assembly 25, and the ring gear 34 is driven in a direction opposite to the direction of rotation of the sun gear 31 by the planets 33.

Figure 6:
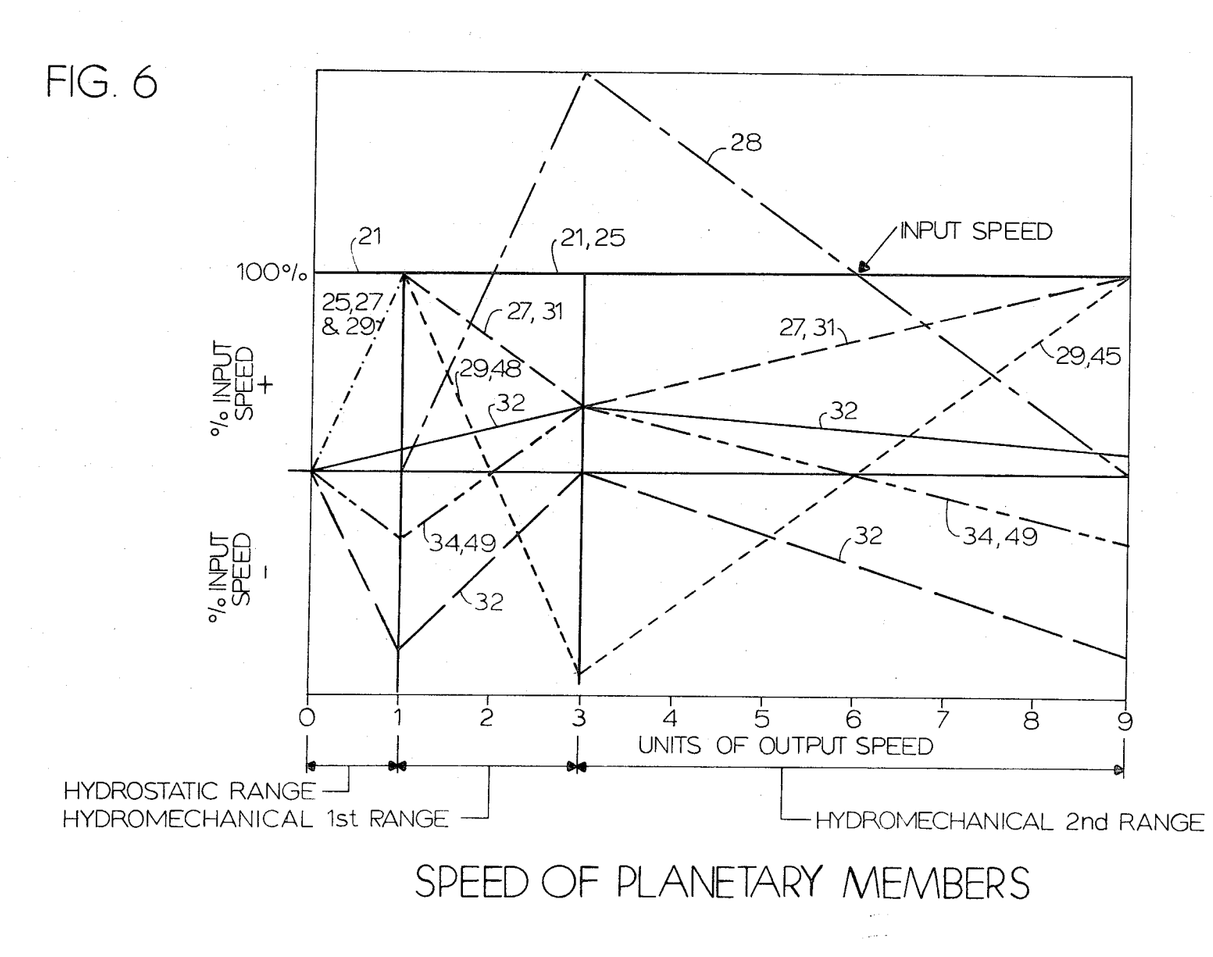
FIG. 6 is a graph plotting the input speeds against the output speeds of the various planetary members of FIG. 1.
Figure 7:
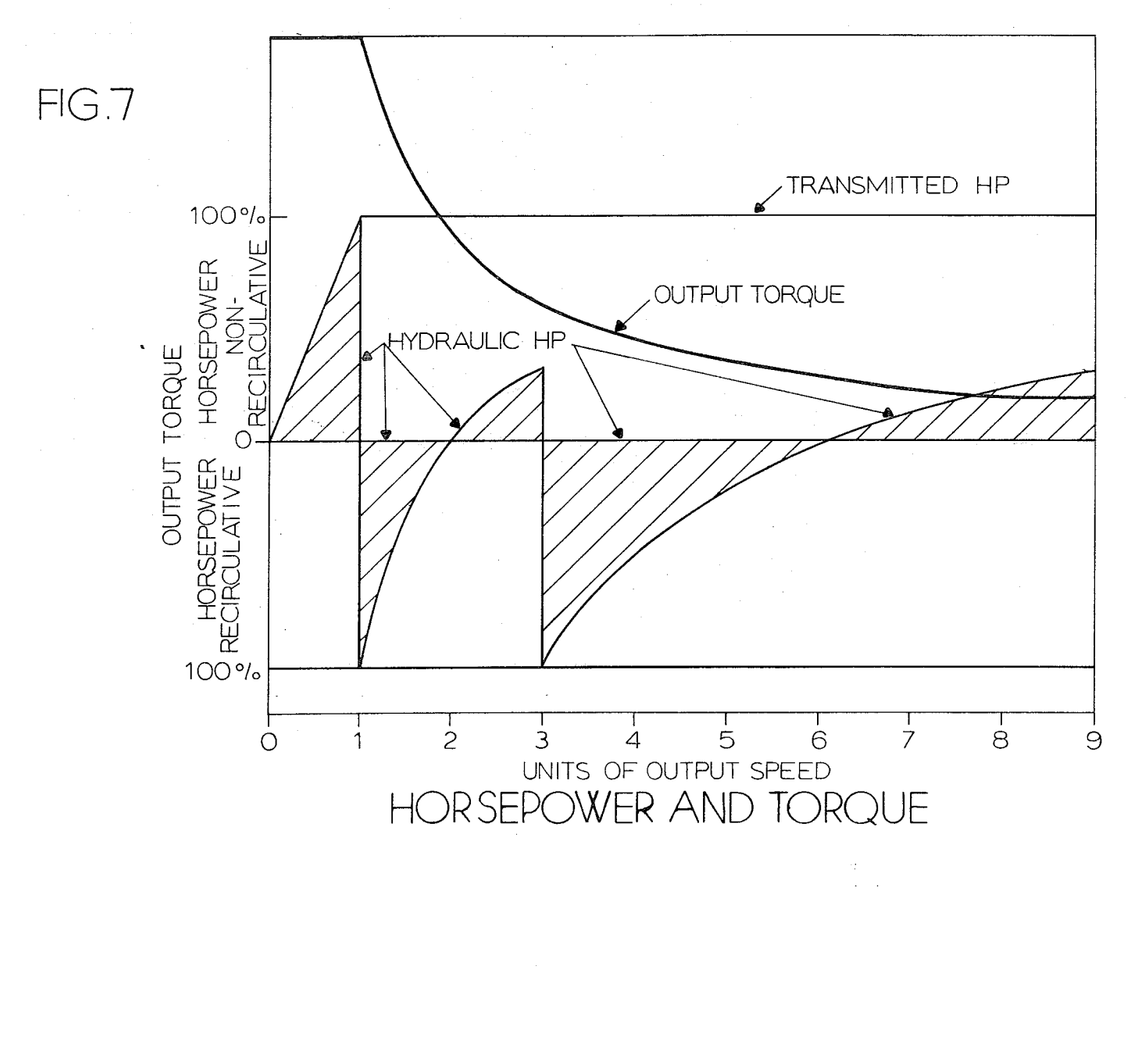
FIG. 7 is a graph showing the torque output of the FIG. 1 device, plotted against units of output speed, and also showing the horsepowers plotted against the output speed.
Figure 8:
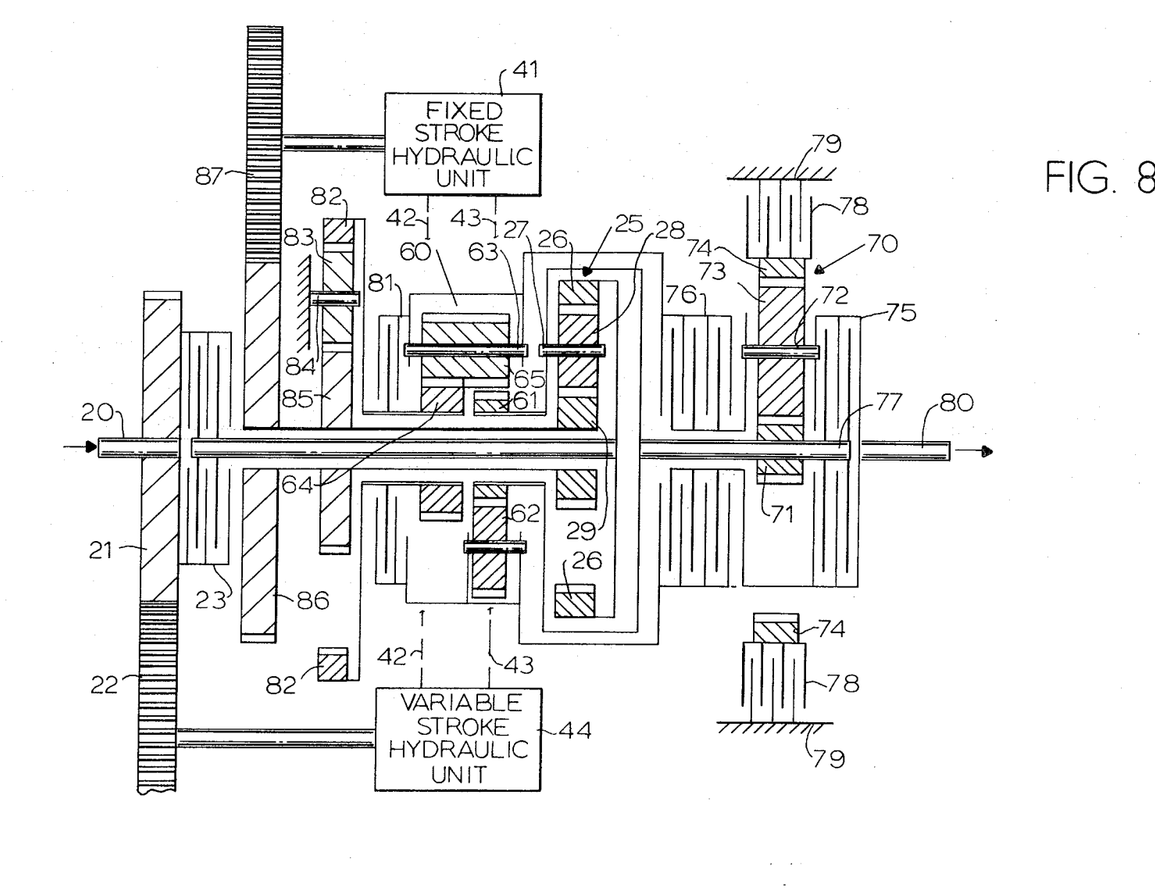
FIG. 8 is a diagrammatic view of a three-range transmission embodying the principles of the invention.

Thus, the speed of the output shaft 40 begins to increase from zero speed to a relative speed of 1 on the output speed scale (see FIGS. 6–8). During this interval, the transmission is operating at maximum and constant output torque, which is usually taken as a value corresponding to the traction limit of the vehicle. During this entire starting or hydrostatic range the horsepower is increasing from a theoretical zero at zero vehicle speed, neglecting transmission losses, to a maximum engine horsepower at point 1 on the output scale.

In the meantime, during this increase in speed, the variable-stroke displacement unit 44 has increased from zero displacement to its maximum displacement, which it reaches at the end of the hydrostatic range.

At the end of this hydrostatic range, the speed of the ring gear 26 is the same as the input speed of the shaft 20, so that the clutch 23 can be and is engaged to connect the input shaft 20 to the ring gear 26. Immediately thereafter, the clutch 35 is disengaged unless it is desired to operate for some length of time at this particular output speed, in which case the clutch 35 can remain engaged. As long as both clutches 23 and 35 are engaged, the transmission is in a straight mechanical drive at this particular ratio. The hydraulic units 41 and 44 rotate and there is oil flow between them, but they are operating at zero working pressure.

When the clutch 23 has been engaged and the clutch 35 is disengaged, the transmission is then in its first hydromechanical range. As soon as the clutch 23 is engaged and the clutch 35 is disengaged, there is a reversal in the function of these hydraulic units. The fixed-stroke hydraulic unit 41, which had been operating as a motor heretofore, becomes a pump, and the variable-stroke hydraulic unit 44, which had been operating as a pump, becomes a motor. The rotation of the hydraulic units 41 and 44 is still in the same direction, but there is a reversal of pressure in the hydraulic lines, even though there is no reversal in the angle of the wobble plate of the variable unit.

To increase the speed in the first hydromechanical range from 1 to 3 on the output speed scale, the clutch 37 remains engaged while the clutch 35 is disengaged, and the clutch 23 remains engaged. The variable-stroke hydraulic unit 44 is at that moment at maximum displacement, while the fixed-stroke hydraulic unit 41 is operating at its maximum speed, as is shown by the speeds of lines 29 and 34 in FIG. 6, point 3 on the output scale.

In this first hydromechanical range, the drive is from the input shaft 20 through the clutch 23 to the ring gear 26, then through the planet carrier 27 of the first planetary assembly 25 to the sun gear 31 of the second planetary assembly 30. The gear 29 serves as reaction for this drive. The gear 31 in turn drives the planetary gears 33, which transmit the drive through the carrier 32 and the clutch 37 to the output shaft 40. The gear 34 also acts as reaction. Thus, the gears 34 and 49 drive the fixed-stroke hydraulic unit 41 through the idler gear 46 and the gear 45. The gear 29 also drives the hydraulic unit 41 through the gears 48, 46, and 45. The fixed-stroke hydraulic unit 41 acts as a pump supplying power to the variable-stroke unit 44, which (acting as a motor) adds the extra torque to the input shaft 20, thus increasing the torque in the entire planetary system or entire transmission, and the final output 40, above the torque supplied by the prime mover or input shaft 20. The hydraulic power is recirculated within the planetary system, and for that reason it is referred to as the recirculative portion of the hydromechanical mode. This will be explained some more below.

To increase the speed of the output shaft 40, the displacement of the variable-stroke hydraulic unit 44 is gradually reduced and this slows down the speed of the fixed-stroke unit 41, while at the same time decreasing the torque supplied by the variable-stroke unit 44 to the input shaft 20. The speeds of the various elements are shown in FIG. 6, where numbers applied correspond to the reference numerals for the respective parts shown in FIG. 1. The output torque and the amount of hydraulic power recirculated within the planetary system also decreases, as shown in FIG. 7.

At point 2 on the output speed scale, the variable-stroke hydraulic unit 44 has reached zero displacement, which hydraulically locks the fixed-displacement unit 41 against rotation. To increase the output speed still further, the variable-stroke hydraulic unit 44 is increased in stroke from zero, but in the opposite direction to which it had formerly moved, so that it now becomes a pump, while the fixed-stroke hydraulic unit 41 becomes a motor and starts rotating in the opposite direction to that in which it was formerly moving. The pressure remains in the same lines 42 and 32 as it was between the output speed 1 and 2, but it will be noted that due to the reversal of stroke of the hydraulic units, the direction of flow in their lines will be in the opposite direction to what it was previously.

Since the variable-stroke hydraulic unit 44 has now become a pump, it takes up some of the torque supplied by the prime mover, and therefore less torque is delivered to the planetary assemblies 25 and 30 and to the final output shaft 40. However, the speed of the output shaft 40 is increased, due to the speed and direction of rotation of the fixed-stroke hydraulic unit 41, and therefore to the effect that has upon the gears 34, 31 and 29. The speed relationships are shown in FIG. 6.

When the variable-stroke hydraulic unit 44 has reached its maximum displacement in this mode, the output speed of the shaft 40 has reached 3 on the output speed scale, and as seen in FIG. 6 the speeds of the carriers 27 and 32 have become synchronized. Therefore, it is now possible to engage the clutch 36. It is possible to remain in purely mechanical drive by not disengaging the clutch 37, for if both the clutches 36 and 37 are engaged, the transmission is in a fixed mechanical ratio, and it can be operated in this manner as long as it is desired to stay at this particular ratio. However, if it is desired to achieve a further increase in speed the clutch 37 will be disengaged. So long as both clutches 35 and 37 are engaged, the hydraulic units 41 and 44 rotate and transfer fluid, but do not transmit power; the fluid is therefore at zero working pressure.

Once the clutch 37 has been disengaged, the output speed can be increased further above 3 on the output speed scale with the clutch 36 remaining engaged. The transmission thus enters its second hydromechanical range, and the fixed-displacement hydraulic unit 41 again becomes a pump, while the variable-stroke hydraulic unit 44 again becomes a motor, and the power is recirculated within the transmission, as was described previously for the first hydromechanical range.

To increase further the output speed, the stroke of the variable-stroke unit 44 is reduced to zero, which occurs at output speed 6. Thereafter it is moved beyond zero and to the opposite direction so that the variable-stroke unit 44 again becomes the pump and the fixed-stroke unit 41 again becomes the motor. Since the fixed-stroke unit 41 begins to rotate in the opposite direction, there is no reversal of pressure in the lines 42 and 43 at this time. The output speed can continue to increase until it reaches the maximum value of 9 on the output scale shown in FIGS. 6–8, where it is then equal to the input speed, and therefore is at its maximum for this particular device. Now, the unit is in direct drive, and if the vehicle is to remain in this condition of operation for a long time, a direct drive is achieved by engaging the clutch 35 so that now the clutches 36 and 23 and 35 are all engaged, the hydraulic units 41 and 44 then rotate, but transmit no power with a zero working pressure.

It will be noted that in some instances, the transmission was in a non-recirculative mode, and that in others it was in a recirculative mode. During the non-recirculative mode, the total power is divided by the planetary system into power transmitted by the mechanical system and power transmitted by the hydraulic system. The mechanically transmitted power is less then 100 percent, and the rest is transmitted hydraulically to make up the balance. The gear and bearing loads in the planetary assemblies are therefore less than those produced by the engine torque, since the torque is divided into a mechanical and a hydraulic path before the torque reaches the planetary assemblies 25 and 30. The variable-stroke hydraulic unit 44, which is connected to the input 20 upstream of the planetary assemblies 25 and 30 acts as a pump in this mode of operation, and the fixed-stroke hydraulic unit 41, which is connected to the reaction members of both planetary assemblies 25 and 30 acts as a motor.

During the interval when the power is transmitted in a recirculative mode, as described above, the entire engine power is delivered to the planetary assemblies 25 and 30. The fixed-stroke hydraulic unit 41, which is connected to the reaction members 29 and 31 of the two planetary assemblies 25 and 30 now acts as a motor and therefore adds torque to the inputs of the planetary assemblies 25 and 30. This results in increased output torque and, at the same time, the gear and bearing loads within the planetary assemblies are increased above the level produced by the engine torque. Thus, the planetary system internally recirculates more than the engine input horsepower. Specifically, the amount equals the engine horsepower plus the percentage of power recirculated to the input hydraulically. The sum of the losses in both systems is therefore greater and the efficiency during thos mode of operation is lower than in the non-recirculative mode.

Figure 4:
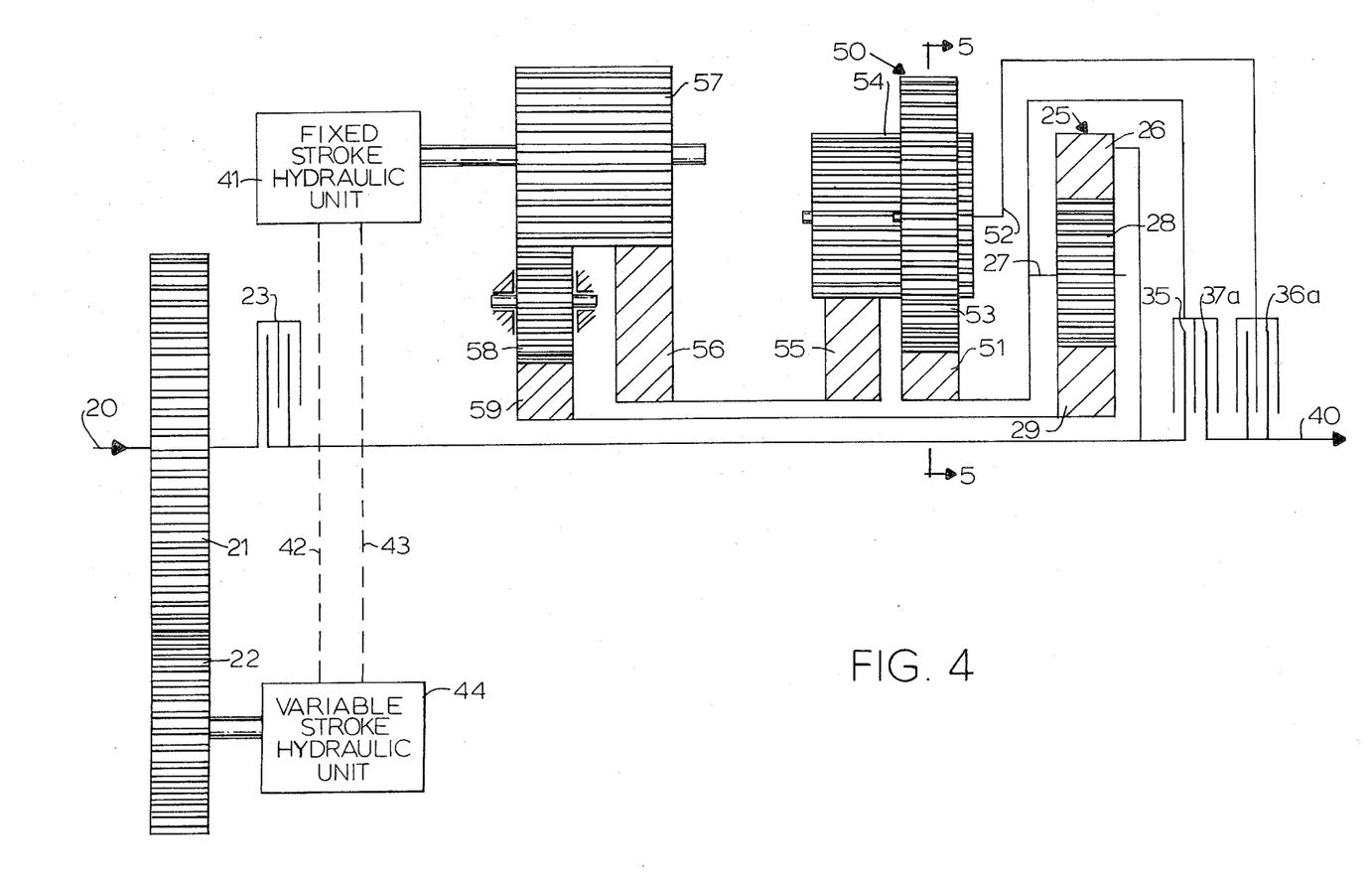
FIG. 4 is a view similar to FIG. 1 of a modified form of the invention.
Figure 5:
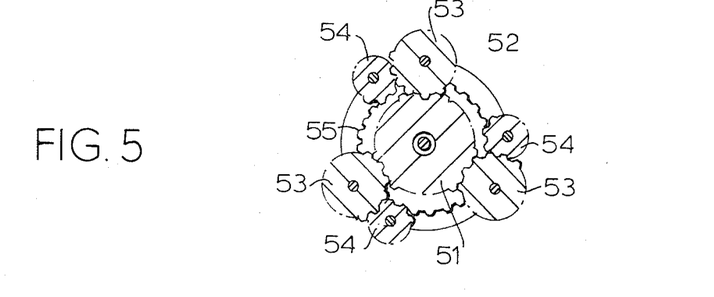
FIG. 5 is a view in section taken along the line 5—5 in FIG. 4, showing the entire round gear.

The unit of FIG. 4

The unit of FIG. 4 is very similar to the unit of FIG. 1, and identical numbers have been used where the parts are identical. The main difference is that certain gears shown as external in FIG. 4 correspond to internal gears in the FIG. 1 structure, so far as performing the same function is concerned. The transmission may be designed either way, the external gears shown in FIG. 4 being somewhat less expensive, while the internal gears shown in FIG. 1 produce less loading on the gear teeth and on the planet pinion bearings, and are therefore capable of greater power capacity.

The first planetary assembly 25 remains the same. In FIG. 4 a second planetary assembly 50 has as its input a first sun gear 51 which, as before, is connected to the carrier 27 of the first planetary assembly 25. The output is a planet carrier 52 which carries two sets of planet gears 53 and 54. Each planet gear 53 is in mesh with one planet gear 54. The planet gears 53 are in mesh with the first sun gear 51, while the planet gears 54 are in mesh with a sun gear 55, which serves as the reaction for the assembly 50 and is in driving relation to a gear 56. The gear 56 is connected to a gear 57 driven by the fixed stroke hydraulic unit. The gear 57 is also in mesh with an idler gear 58, which in turn is meshed with a gear 59 that is in driving relation to the sun gear 29, which is the reaction gear for the first planetary assembly 25. The clutch system is the same as before. The operation is substantially the same as that already described, with all the differences being clearly apparent from the face that the individual parts do vary somewhat.

Figure 9:
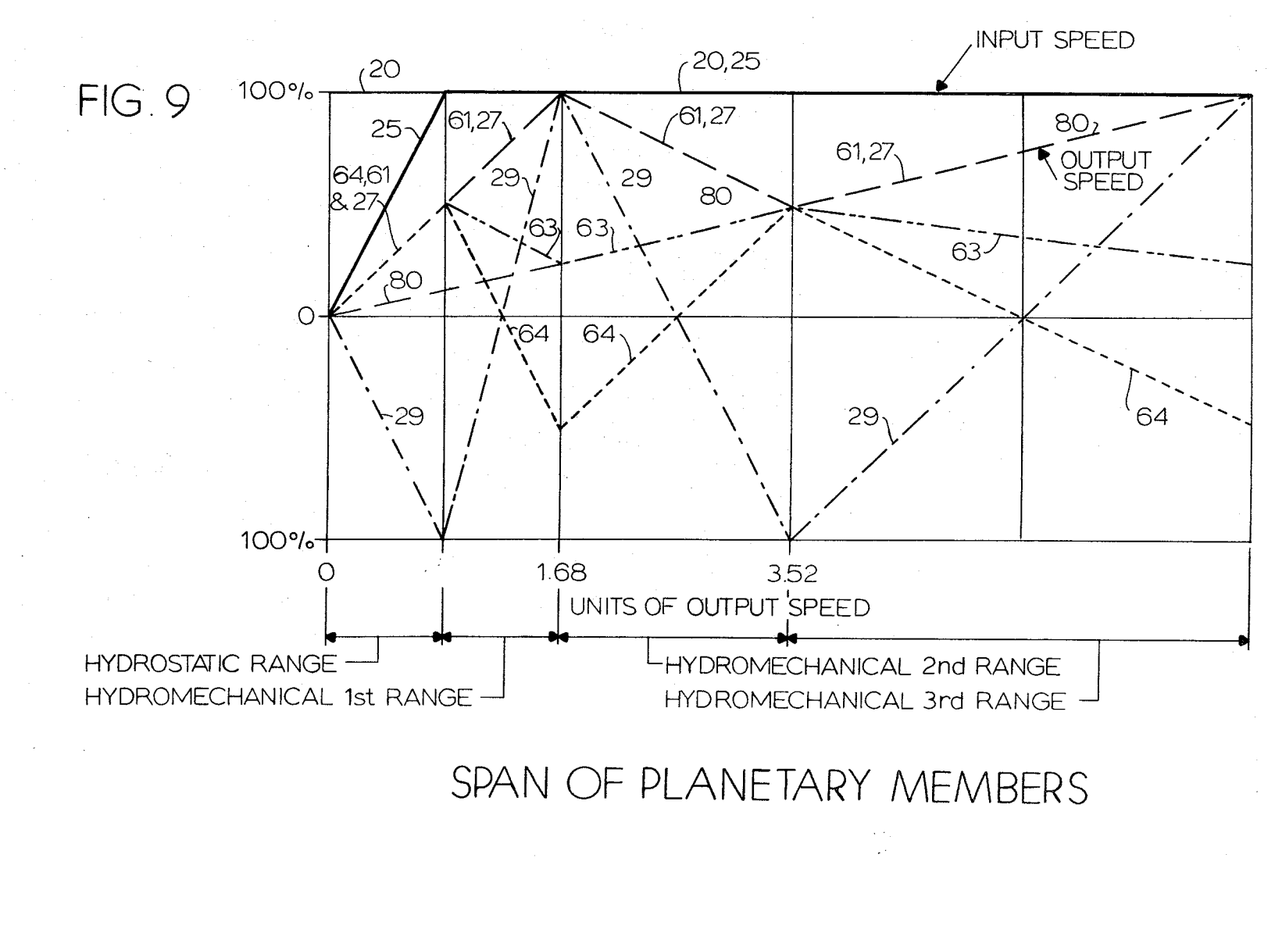
FIG. 9 is a graph similar to FIG. 6 for the transmission of FIG. 8.

The three range transmission of FIGS. 8 and 9

The function of this three-range transmission is the same as that of the two-range transmissions previously described, except that three hydromechanical ranges are used, and this requires one more planetary assembly and one more clutch than is used in the two-range transmission. Using three ranges reduces still further the required amount of hydraulic power.

The first planetary assembly 25 remains unchanged. A second planetary assembly 60 has a first sun gear 61 locked to the planet carrier 27 of the first planetary assembly 25. The sun gear 61 engages a first set of planet gears 62 carried by a planet carrier 63, and there is a second sun gear 64 also in mesh with a second set of planet gears 65. The planet gears 62 and 65 are both on the same carrier 63 and each gear of the set 62 is in mesh with one gear of the set 65.

A third planetary assembly 70 has a sun gear 71, a planet carrier 72 with the planet gears 73 and a ring gear 74. The planet carrier 72 is at all times connected to an output shaft 80.

The planet carrier 72 is connected to one set of plates of a clutch 75 and to one set of plates of a clutch 76. The other set of plates of the clutch 75 is connected to a shaft 77, which is driven by the carrier 27 of the first planetary assembly 25, and the sun gear 71 is secured to the shaft 77 and is driven by it. The other set of plates of the clutch 76 is connected to the planet carrier 63 of the second planetary assembly 60. The ring gear 74 is clutchable by a clutch 78 to a stationary frame member 79.

The planet carrier 63 is also connected to one set of plates of a clutch 81, the other plates of which are connected to the gear 64 and to a gear 82. The gear 82 is part of a gear train having an idler gear 83 mounted on a stationary shaft 84 and a gear 85 that is connected to the sun gear 29 in driving relation therewith and also in driving relation to a gear 86. The gear 86 is connected to the fixed-stroke hydraulic unit 41 through a gear 87.

In starting from standstill (or in reverse) the transmission operates in a purely hydrostatic mode.

The clutch 23 is disengaged, and the clutch 81 is engaged to lock the second planetary assembly 60. The drive is therefore from the input shaft 20 through the gears 21 and 22 to the variable-stroke hydraulic unit 44, operating as a pump. From this unit 44, the power is transmitted hydraulically to the fixed stroke hydraulic unit 41, acting as a motor, which drives the gears 87 and 86. The gear 85, which is driven directly by the gear 86, drives the gear 82 in the opposite direction by means of the idler 83, and the gear 82 drives the gear 64. Since the second planetary assembly 60 is locked, the gear 61 turns at the same speed and in the same direction as the gears 64 and 82. The drive is thus transmitted to the carrier 27 of the first planetary assembly 25 and to the shaft 77 and thereby to the sun gear 71 of the third planetary assembly 70. The ring gear 74 of this third planetary assembly 70 is grounded to the case 79 by the clutch 78, which is also engaged. This causes rotation of the planet carrier 72 and therefore rotation of the output shaft 80 in this starting or hydrostatic range.

At the start of the hydrostatic range, the variable-stroke unit 44 is on zero stroke, and the fixed-stroke unit 41 is therefore stationary. As the stroke of the variable-stroke unit 44 is increased, it increases the output speed of the shaft 80. When the hydraulic unit 44 reaches its maximum stroke, the hydraulic unit 41 reaches its maximum speed.

At this point, the speed of the ring gear 26 of the first planetary assembly 25 reaches the same speed as the input shaft 20, and the clutch 23 can therefore be engaged, and the clutch 81 thereafter is disengaged. The clutch 78 is still engaged.

The transmission is now in its first hydromechanical range, and the drive is through the planet carrier 27 of the first planetary assembly 25, and operation of the transmission in this range is the same as described earlier for the two-range transmission.

The variable-stroke unit 44, which heretofore was a pump, now becomes a motor, and adds power to the input by means of the fixed-stroke unit 41. This is the recirculating mode. As the stroke of the unit 44 is decreased, the speed of the unit 41 is decreased, until it reaches zero speed at zero stroke of the unit 44. Beyond this point the unit 44 becomes a pump and is stroked in the opposite direction, with the unit 41 acting as a motor. There is no recirculation in this mode.

The speed of the output member 27 of the planetary assembly 25 continues to increase, until the variable-stroke unit 44 again reaches its maximum displacement. The speeds of the shafts 77 and 80 are equal at this point, and the clutch 76 is then engaged. The clutch 78 is immediately thereafter disengaged, and the second hydromechanical range begins. The hydraulic units 41 and 44 again reverse functions, and go through the same program of operation as described before, with the planet carrier 63 increasing its speed at the same time, the planet carrier 27 is decreasing its speed, and at the conclusion of the second hydromechanical range, their speeds are equal. The clutch 75 is then engaged, and the clutch 76 is immediately thereafter disengaged, and the transmission now enters the third hydromechanical range, in which the output member is the planet carrier 27. The function of the hydraulic units 41 and 44 again goes through the same program as in each of the first two ranges, as described before.

In a three range transmission it is possible to have a low range and a high range in hydrostatic mode either forward or reverse. If the operating conditions are such (either forward or reverse) that the maximum output torque is not required, then while the vehicle is stationary with the clutch 23 disengaged, and the clutch 81 engaged (the variable-stroke unit 44 is on zero stroke at this point), it is possible to engage the clutch 76 rather than the clutch 78. This makes the output speed faster, and, at the same time, the output torque is less. In this case, the transmission can operate as a two range transmission, with lower maximum output torque.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A transmission comprising first and second planetary assemblies, each having input means, output means, and reaction means, the output means for the first said assembly being in driving relation with the input means of the second said assembly, the two said reaction means being geared together for rotation in opposite directions.

2. The transmission of claim 1 having first and second hydraulic units connected together so that when one is a pump the other is a motor and vice versa, said first hydraulic unit having a fixed stroke and drivingly connected to said two reaction means, said second hydraulic unit having a variable stroke and drivingly connected to said input means of said first assembly.

3. A transmission comprising first and second planetary assemblies, each having input means, output means, and reaction means, the output means for the first said assembly being in driving relation with the input means of the second said assembly, and speed varying means for causing one said output means to increase its speed and for simultaneously causing the other said output means to decrease its speed and vice versa, said speed varying means comprising a pair of hydraulic units hydraulically interconnected so that one serves as a pump while the other serves as a motor and vice versa, a first said unit being connected in driving relation to said input means, a second said unit being connected in driving relation to said reaction means.

4. The transmission of claim 3 wherein said first unit is variable in stroke and runs during operation at constant speed while said second unit is fixed in stroke and variable in speed.

5. The transmission of claim 3 wherein the two said reaction means are geared together for rotation in opposite directions.

6. A transmission comprising
an input shaft,
an output shaft,
first and second planetary assemblies, each having input means, output means, and reaction means, the output means for the first said assembly being in driving relation with the input means of the second said assembly,
first clutch means for connecting said input shaft directly to said input means of said first assembly,
second clutch means for connecting the output means of the first assembly to said output shaft,
third clutch means for connecting the output means of the second assembly to said output shaft,
first and second hydraulic units connected together so that when one is a pump the other is a motor and vice versa, said first hydraulic unit having a fixed stroke and said second hydraulic unit having a variable stroke and driven by said input shaft,
a gear train having a gear driven by said fixed hydraulic unit and connected through different gears of said train to the reaction means of both said first and second assemblies.

7. The transmission of claim 6 wherein said two reaction means are geared together for rotation in opposite directions.

8. The transmission of claim 6 wherein both said output means are planetary carriers.

9. The transmission of claim 6 having fourth clutch means connecting the input means of the first assembly to the output means thereof.

10. The transmission of claim 6 having fourth clutch means for connecting the output means of said second assembly to the reaction means thereof.

11. The transmission of claim 6 having a third planetary assembly having input means drivingly connected to the output means of said first assembly, output means directly connected to said output shaft, and reaction means, said transmission having a stationary case and fourth clutch means for clutching said reaction means to said case.

12. The transmission of claim 11 having fifth clutch means for connecting the output means of said second assembly to the reaction means thereof.

13. A transmission including in combination
a first planetary assembly having a first sun gear, a first planet carrier, a first set of planet gears, and a first ring gear,
a second planetary assembly having a second sun gear in driving relation to said first planet carrier, a second planet carrier, a second set of planet gears, and a second ring gear,
an input shaft,
first clutch means for clutching said input shaft for direct drive of said first ring gear,
an output shaft,
second clutch means for clutching said output shaft directly to said first planet carrier,
third clutch means for clutching said second planet carrier to said output shaft,
a gear train having a first gear in driving relation with said first sun gear, a second gear in driving relation with said second ring gear, and gear means linking said first and second gears together for rotation in opposite directions, and
a pair of hydraulic units joined so that when one acts as a pump the other acts as a motor, and vice versa, a first said hydraulic unit having a variable stroke and driven by said input shaft, and a second said hydraulic unit having a fixed stroke and driven by said gear train.

14. The transmission of claim 13 wherein said gear train comprises an idler gear mounted on a stationary shaft, an inner external gear serving as said first gear in driving relation with said first sun gear and in mesh with said idler gear, a ring gear serving as said second gear and in driving relation with said second ring gear and in mesh with said idler gear, and a reaction drive gear in mesh with said idler gear, said second hydraulic unit being in direct driving relationship with said reaction drive.

15. The transmission of claim 13 having fourth clutch means for clutching said first ring gear to said first planet carrier.

16. A transmission, including in combination
an input shaft,
a first planetary assembly having a first sun gear, a first planet carrier, a first set of planet gears, and a first ring gear,
first clutch means for clutching said input shaft to said first ring gear,
a second planetary assembly having a second sun gear in driving relation with said first planet carrier, a second planet carrier, second and third sets of planet gears both carried by said second planet carrier, with each gear of said second set in mesh with a gear of said third set, said second sun gear being in mesh with said second set of planet gears, and a third sun gear in mesh with said third set of planet gears, an output shaft, second clutch means for clutching said output shaft to said first planet carrier, third clutch means for clutching said output shaft to said second planet carrier, a gear train having a first gear in driving relation with said first sun gear, a second gear in driving relation with said third sun gear, and gear means linking said first and second gears together for rotation in opposite directions, a pair of hydraulic units joined so that when one is a pump the other is the motor therefor and vice versa, one said unit having a fixed stroke and in driving relationship with said gear train, the other unit having a variable stroke and driven by said input shaft.

17. The transmission of claim 16 wherein said gear train has an idler gear mounted on a stationary shaft, an inner gear serving as said first gear and in driving relation with said first sun gear and in mesh with said idler gear, a reaction drive gear in mesh with said idler gear, and a transmitting gear serving as said second gear and in mesh with said reaction drive gear and in driving relation with said third sun gear, and a pair of hydraulic units joined so that when one is a pump the other is the motor therefor and vice versa, one said unit having a fixed stroke and driving said reaction drive gear, the other said unit having a variable stroke and driven by said input shaft.

18. The transmission of claim 16 having fourth clutch means for clutching said first ring gear to said first planet carrier.

19. The transmission of claim 17 wherein said gear train comprises an idler gear between said first and second gears, said first gear being an external gear and said second gear being a ring gear, a third gear in driving relation with said first gear, and a fourth gear in mesh with said third gear and in driving relation with said fixed hydraulic unit.

20. The transmission of claim 19 having a third planetary assembly with a fourth sun gear drivingly connected to said first carrier, a third planet carrier in driving relationship with said output shaft, a fourth set of planet gears, and a second ring gear.

21. The transmission of claim 20 wherein said transmission has a stationary case and fourth clutch means for clutching said second ring gear to said case.

22. The transmission of claim 21 having fifth clutch means for clutching said second carrier to said third sun gear.

* * * * *

UNITED STATES PATENT OFFICE
CERTIFICATE OF CORRECTION

Patent No. __3,783,711__    Dated __January 8, 1974__

Inventor(s) __Elias Orshansky, Jr.__

It is certified that error appears in the above-identified patent and that said Letters Patent are hereby corrected as shown below:

Abstract, lines 1-2, "assembiles" should read --assemblies--.

Column 6, line 36, "thos" should read --this--.

Column 7, line 2, "face" should read --fact--.

Column 12, line 9, which is line 1 of claim 19, "claim 17" should read --claim 16--.

Signed and sealed this 2nd day of July 1974.

(SEAL)
Attest:

EDWARD M. FLETCHER,JR.        C.MARSHALL DANN
Attesting Offficer            Commissioner of Patents